United States Patent
Watanabe et al.

[11] Patent Number: 5,901,972
[45] Date of Patent: May 11, 1999

[54] LINK MECHANISM

[75] Inventors: Takahiro Watanabe; Masao Kiyota; Hiroshi Yamahata; Toshio Enomoto, all of Kanagawa-ken, Japan

[73] Assignee: Nissan Motor Co., Ltd., Yokohama, Japan

[21] Appl. No.: 08/715,217

[22] Filed: Sep. 17, 1996

[30] Foreign Application Priority Data

Sep. 27, 1995 [JP] Japan .................................. 7-249553

[51] Int. Cl.$^6$ .................................................. B60G 11/20
[52] U.S. Cl. .......................... 280/124.152; 280/124.107; 280/124.108; 280/124.134
[58] Field of Search ................. 280/124.152, 124.107, 280/124.108, 124.106, 124.134

[56] References Cited

U.S. PATENT DOCUMENTS 5,588,664 12/1996 Moon ............................... 280/124.107

Primary Examiner—Christopher P. Ellis
Assistant Examiner—David R. Dunn
Attorney, Agent, or Firm—Foley & Lardner

[57] ABSTRACT

A link mechanism, such as a panhard rod or the like, has a rod section and a collar section at each of its two ends. One collar section is supported on the case side bracket through a bushing. The other collar section is supported on the body side bracket through a bushing. A mass is provided at each collar section for limiting vibrations. Each mass is configured so that its principal inertia axis coincides with the principal elastic axis of its bushing in at least one direction of the bending vibration mode of the rod section so that the nodes of the bending vibration mode of the panhard rod also coincide with the principal inertia axis of the mass and thus the principal elastic axis of the bushing. This significantly dampens the vibrations imparted to the link mechanism.

5 Claims, 9 Drawing Sheets

LINK MECHANISM

BACKGROUND OF THE INVENTION

The present invention relates to a link mechanism utilized for a panhard rod (a lateral rod) and so forth in five-link-type rear suspension for an automobile.

Conventionally, this kind of link for example, as a panhard rod, which is used for a rear suspension is shown in FIG. 1 (referring to "New Version Structure of chassis [1]" published by K. K. Sankaido, Mar. 25, 1995, pages 200 to 201). The rear suspension is a five-link-type suspension, in which an axle case 1 is suspended from a car body, the rear suspension includes lower links 3 at right and left thereof, upper links 5 at right and left thereof (only illustrated right side portion of the body width lateral direction), shock absorbers 7 at right and left thereof, and coil sprigs 9 at right and left thereof, and further includes a panhard rod 11 as a link. The right end of the body width lateral direction of the panhard rod 11 is supported on the case side bracket (not illustrated), which is mounted on the axle case 1, while the left end thereof is supported being body side bracket (not illustrated), which is mounted on the portion of the car body side. Further, the case side bracket which transmits the vibration from the differential device to the panhard rod 11 through the axle case 1, becomes an exciting side portion, while the body side bracket becomes a receiving side portion.

Such panhard rod 11 is constituted as shown in FIG. 2. Namely, the panhard rod 11 has collar sections 17a, 17b on both ends of a hollow rod section 15. A mass 19 for limiting vibration is fixed to the collar section 17b. One collar section 17a is supported on the body side bracket being receiving side portion through a bushing of an elastic body not illustrated. The other collar section 17b is supported being case side bracket 13 on the exciting side portion through a bushing of an elastic body not illustrated. Consequently, the lateral force input from the wheel toward the axle shaft 1 is capable of being supported by the panhard rod 11 to the car body side.

Now, if the panhard rod 11 is supported as described above, the vibration (different whine) at for example approximately 400 Hz caused by engagement of differential device supported on the inside of the axle case 1 is imputed to the panhard rod 11 through the axle case 1 and the case side bracket. Furthermore, this vibration is imputed to the car body through the body side bracket, so there is fear that the vibration causes the room noise of the car body. This is attributed to the fact that the panhard rod 11 bending-vibrates with the mode such as representation of the chain line of FIG. 3 by the diff noise. Further, although only FIG. 3 shows the primary vibration and the secondary vibration, other multiple vibration exist. Namely, the nodes 21 of the bending vibration mode exist on the rod section 15 of the panhard rod 11, while the nodes 21 do not exist on the principal inertia axis of the bushings on the inside of the collar sections 17a, 17b, the collar sections 17a, 17b vibrate in the direction of up and down such as the arrows N, so that the diff noise is transmitted to the car body.

For this reason, conventionally, the mass 19 is provided thereto, and the vibration of the collar section 17b is suppressed by weight of the mass 19, with the result that transmission of the vibration to the car body is regulated. Further, in order to suppress the vibration of the collar sections 17a, 17b by the mass 19, it causes the weight thereof to increase as large as possible.

However, the mass 19 is regulated in the supported condition in such a way that the mass 19 does not enter into the portion 23 indicated by hatching of FIG. 2, in relation to the case side bracket 13 which supports the collar section 17b or another parts. Consequently, the mass 19 is incapable of being enlarged unlimitedly so that there are limits of vibration-suppressing function by weight thereof. Furthermore, if the mass 19 is enlarged as large as possible, a periphery of the bracket 13 is susceptible to be large-sized. That would be disadvantageous since the space is very crowded with a plurality of parts.

SUMMARY OF THE INVENTION

In view of the foregoing, it is an object of the present invention to provide a link mechanism in which vibration-suppressing-function is significantly improved and the size of the link mechanism can be made smaller.

According to one aspect of the present invention, for achieving the above-mentioned object, there is provided a link mechanism including a rod section, and collar sections one, of which is supported on an exciting side portion thereof and the other of which is supported on a receiving side portion thereof through bushings of elastic body provided on both ends of the rod section. The link mechanism includes a mass for limiting vibration provided for at at least one of the collar sections so that the mass causes the principal inertia axis of the mass to reconcile with the principal elastic axis of the bushings about its bending vibration mode of at least one direction of the rod section.

As stated above, by causing the principal inertia axis of the mass to reconcile with the principal elastic axis, the node of the bending vibration mode toward the collar section is capable of being moved, and the vibration of the collar section can be suppressed substantially. Further, the size of mass can be minimized. Consequently, the size of the collar section including the mass can be suppressed so that miniaturization can be undertaken. This becomes advantageous with regard to the space.

Preferably, the mass may have a symmetrical shape about the principal inertia axis. This would result in easy manufacturing thereof.

Further, the mass may be formed integrally with the collar section. This would result in easy manufacturing thereof.

Moreover, also the exciting side portion may be a case side bracket fixed on the axle case of an automobile, and the receiving side portion may be a body side bracket fixed on the automobile.

For this reason, it causes the periphery of the case side bracket or the periphery of the body side bracket can be miniaturized, and transmission of diff noise or the like toward the body side portion can certainly be suppressed. Consequently, this would become very advantageous particularly since the space is very crowded with a plurality of parts.

DESCRIPTION OF THE PREFERRED EMBODIMENTS

Figure 1:
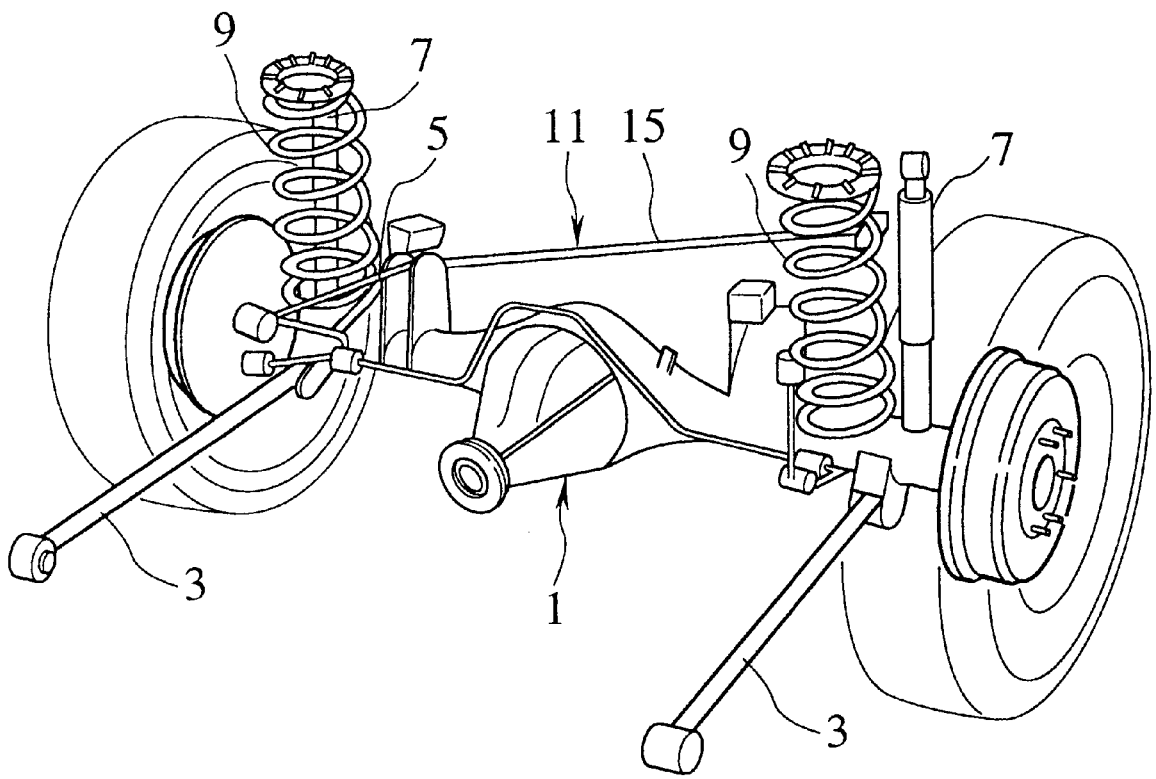
FIG. 1 is a perspective view showing a conventional rear suspension.
Figure 2:
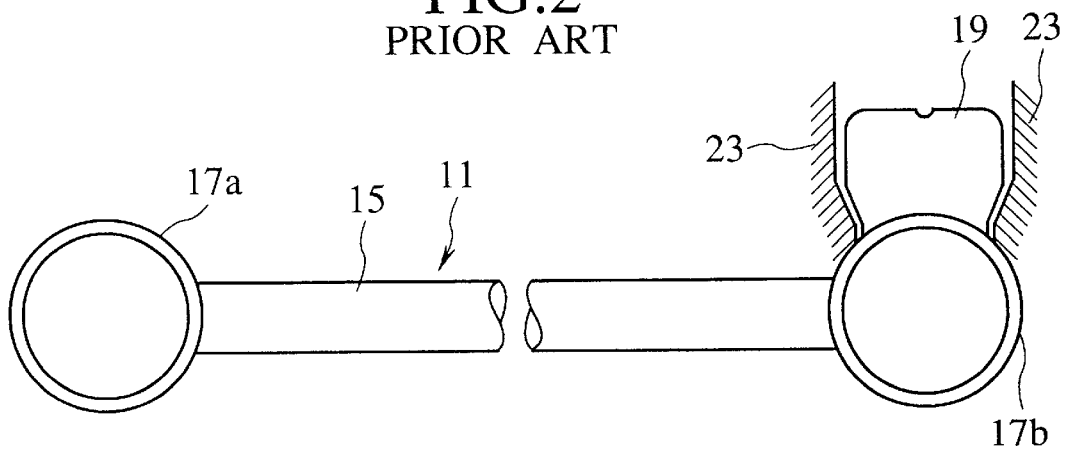
FIG. 2 is a side view showing a conventional panhard rod.
Figure 3:
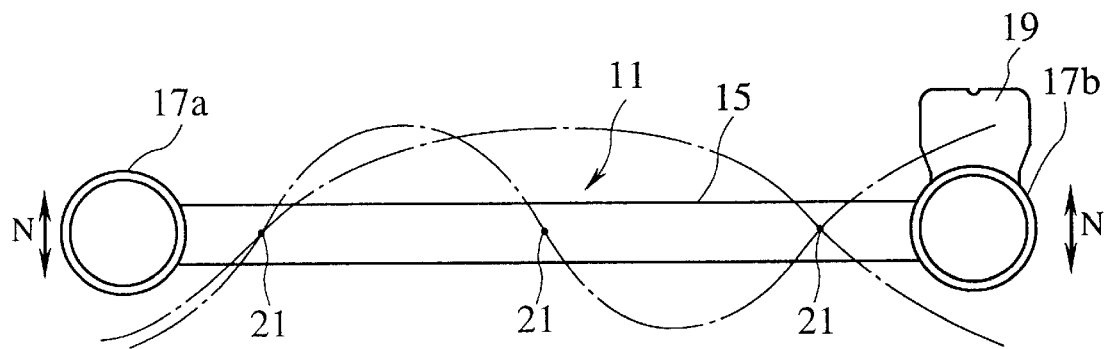
FIG. 3 is a side view showing a bending vibration mode of a conventional panhard rod.
Figure 4:
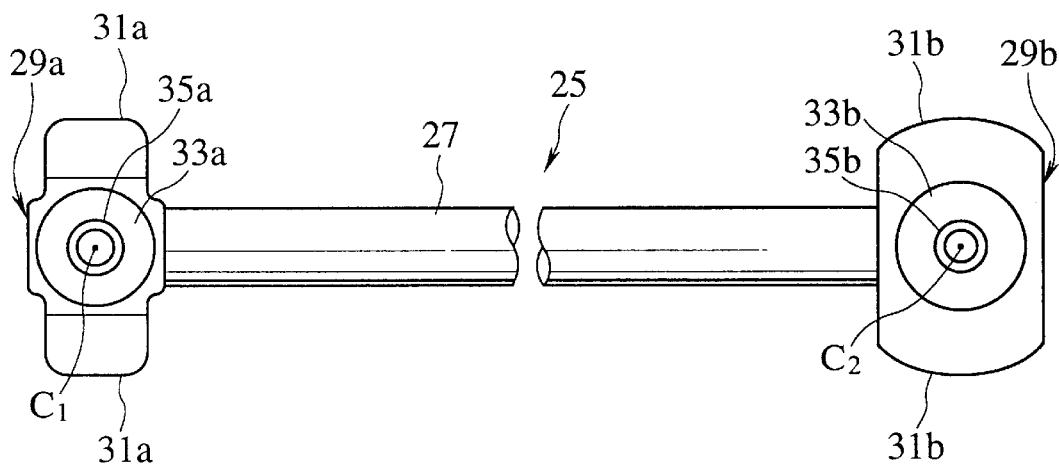
FIG. 4 is a side view showing a panhard rod according to an embodiment of the present invention.
Figure 5:
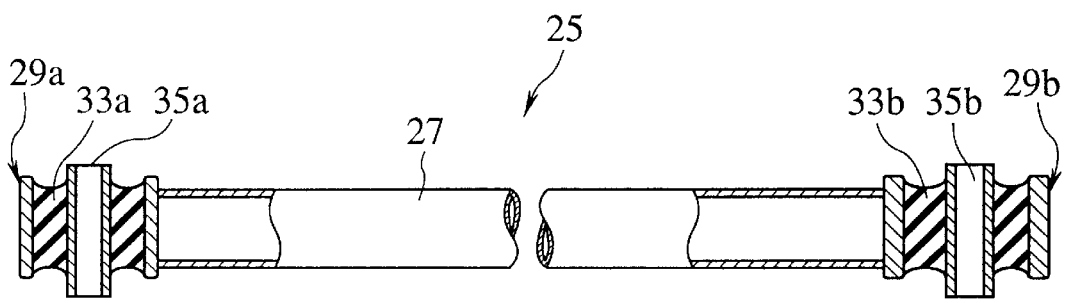
FIG. 5 is a transverse cross sectional view showing a panhard rod according to an embodiment of the present invention.

A preferred embodiment of the present invention will be described accompanying drawings. FIGS. 4 and 5 show a panhard rod (a lateral rod) 25 according to one embodiment of the present invention. The panhard rod 25 comprises a hollow rod section 27 and collar sections 29a, 29b on both sides thereof.

The collar sections 29a, 29b have masses 31a, 31b for limiting vibration. Each of the masses 31a, 31b is integrally formed with each of the collar sections 29a, 29b. Further in this embodiment, the collar section 29a and the mass 31a are symmetrical shape in the direction both sideways and up and down about the center C1 of the collar section 29a, and the collar section 29b and the mass 31b are symmetrical shape in the direction both sideways and up and down about the center C2 of the collar section 29b. Moreover, in this embodiment, relation between weight m1 of the mass 31a and weight m2 of the mass 31b is established to m1<m2.

Vulcanized molded-Rubber-made bushings 33a, 33b as the elastic body are provided at the inside of collar section 29a, 29b where cylinder liners 35a, 35b fixed on the frame side bracket and the case side bracket described hereinafter respectively, are supported. On account of both establishments m1 and m2 for masses 31a, 31b and m1<m2, the masses 31a, 31b are so established that it causes a principal inertia axis of the masses 31a, 31b to reconcile with a principal elastic axis of the bushings 33a, 33b with respect to the bending vibration mode in the direction of up and down of the rod section 27, for example.

Figure 6:
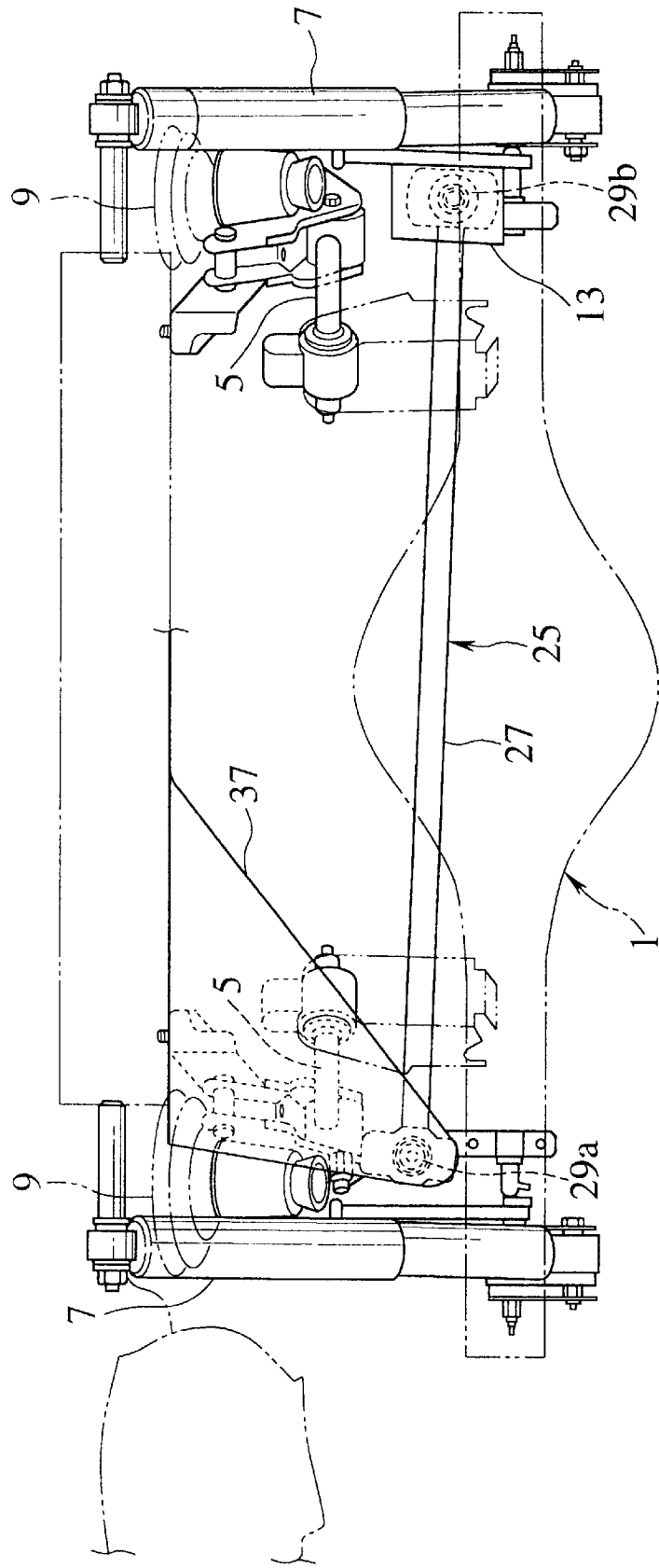
FIG. 6 is a rear side view showing a rear suspension in which the panhard rod is mounted on a car body side.
Figure 7:
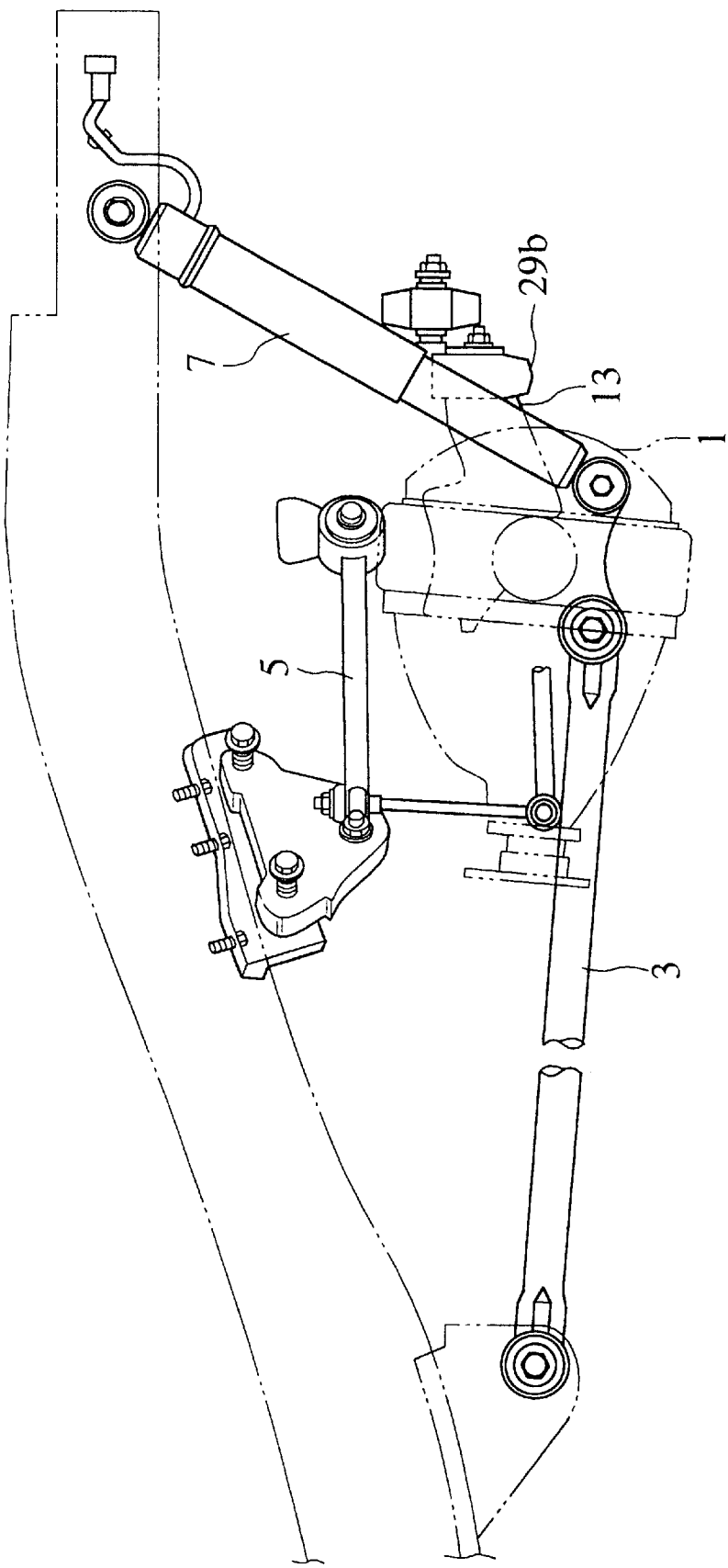
FIG. 7 is a plan view showing a rear suspension in which the panhard rod is mounted on the car body side.

FIGS. 6 and 7 show a mounting condition of the panhard rod 25 toward the car body side. FIG. 6 is a rear side view looking from rearward of the car body, and FIG. 7 is a side view looking from left side of the car-width-direction. The panhard rod 25 shown in FIGS. 6 and 7 are fixed on as the component parts of the five-ring-type rear suspension. Namely, the panhard rod 25 is arranged toward the car-width-direction at the rear side of an axle case 1. The a rear differential device is equipped internally on the center portion of the axle case 1. The collar section 29a is supported by the body side bracket 37 fixed on the frame side portion of the car body which belongs to a receiving-side. The collar section 29b is supported by the case side bracket 13 fixed on the axle case 1, which belongs to an excitation-side. Further, the rear suspension includes lower links 3 at right and left thereof, upper links 5 at right and left thereof, shock absorbers 7 at right and left thereof and coil springs 9 at right and left thereof.

Figure 8:
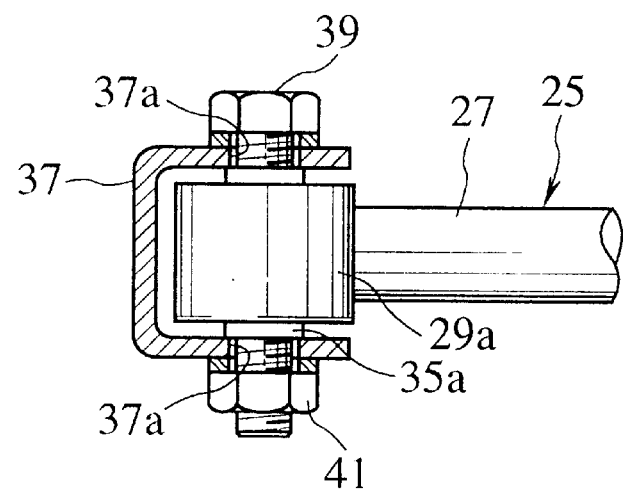
FIG. 8 is a transverse cross sectional view showing a supporting of the panhard rod for a body side bracket.

Concrete supporting structure of the collar section 29a is shown in FIG. 8, which is shown by transverse cross sectional view. Namely, the body side bracket 37 is U-shape in cross-section, which bracket is opened to the inside of the car-width-direction, and has a penetrated hole 37a for supporting. The collar section 29a is arranged on the inside of the body side bracket 37, by causing a nut 41 to screw on a bolt 39 inserted into the penetrated hole 37a and cylinder liner 35a, the collar section 29a is supported rotatably by the body side bracket 37.

Figure 9:
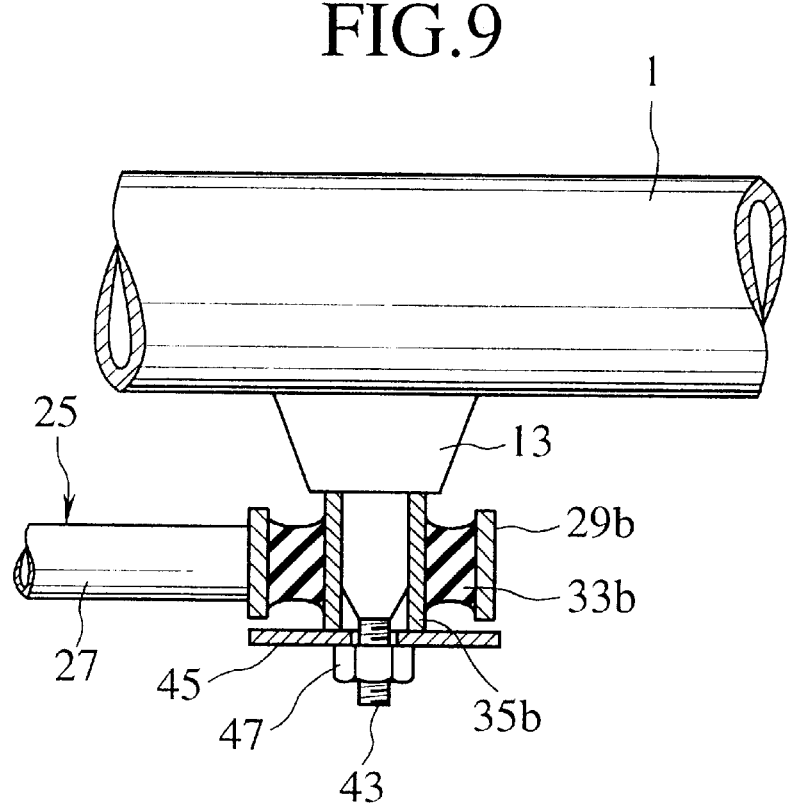
FIG. 9 is a transverse cross sectional view showing a supporting of the panhard rod for a case side bracket.

Concrete supporting structure of the collar section 29b is shown in FIG. 9 which is shown by transverse cross sectional view. Namely, the case side bracket 13 is fixed integrally on the axle case 1 by welding or the like, and a supporting pin 43 is projected on the case side bracket 13. The cylinder liner 35b of the collar section 29b is fitted onto the supporting pin 43, and the nut 47 is screwed thereon through a washer 45 with the the cylinder liner 35b of the collar section 29b supported rotatably.

Further, in this embodiment, the lateral force input from the wheel toward the axle shaft is capable of being certainly supported by the panhard rod 25 through the axle case 1, the case side bracket 13, and the body side bracket 37 to the car body side.

Figure 10:
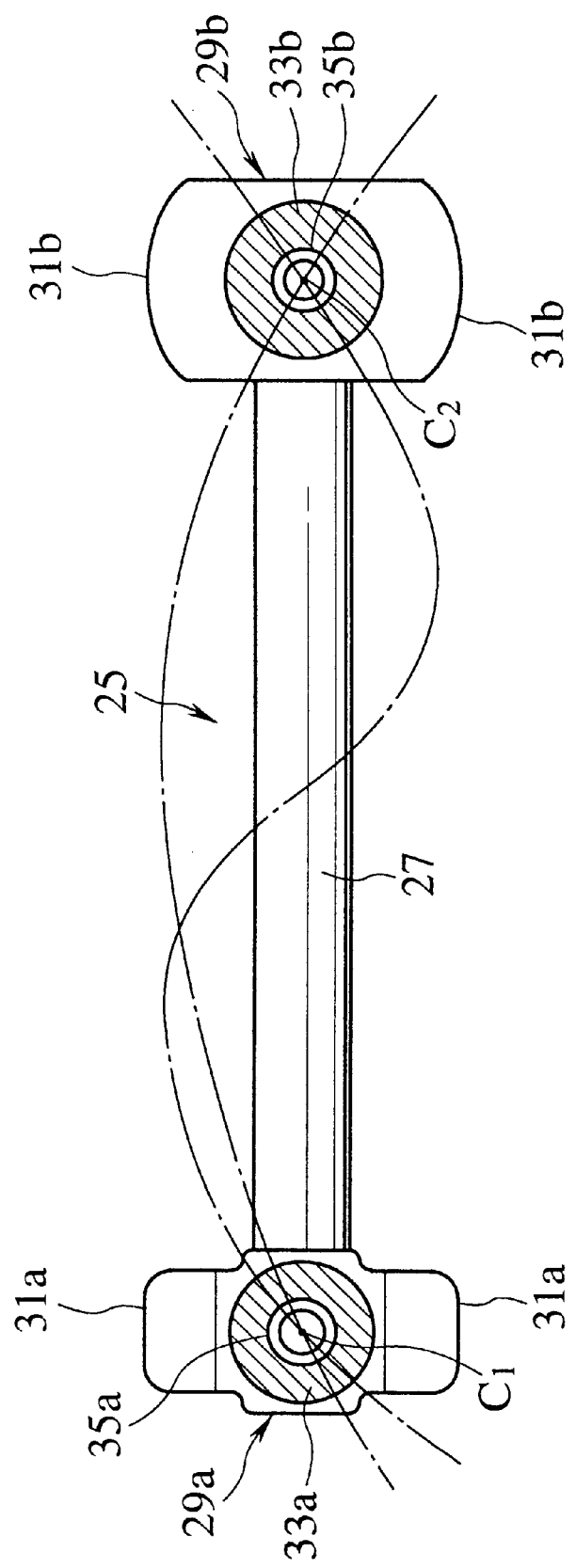
FIG. 10 is a side view showing a bending vibration mode of the panhard rod.

Particularly, in this embodiment, the bending vibration mode of the panhard rod 25 to differential whine noise behaves as shown in FIG. 10. Namely, on account of reconciliation between the principal elastic axis and the principal inertia axis caused by establishing of the weights m1, m2 for masses 31a, 31b respectively, the bending vibration mode of the panhard rod 25 behaves as shown by the chain line of FIG. 10. Namely, nodes of the bending vibration mode pass through the center portions C1, C2 of the collar sections 29a, 29b. For this reason, even if the (differential whine noise) is imputed from the axle case 1 to the panhard rod 25, vibration of the collar sections 29a, 29b can be suppressed substantially, mutins room noise of the car body by the diff noise is capable of being. Since this structure is not the case in which it causes the vibration to suppress by only adding the masses, the size of the masses can be reduced substantially, and also the case side bracket 13 and the body side bracket 37 are capable of being miniaturized extremely. For this reason, this brings very advantageous structure with regard to peripheral spaces of both of the case side bracket 13 and the body side bracket 37, in that the parts are concentrated. Furthermore, in this embodiment, since the collar sections 29a, the mass 31a and the collar section 29b, the mass 31b are formed symmetrically, the structure becomes simple, and manufacturing becomes easy.

Figure 11:
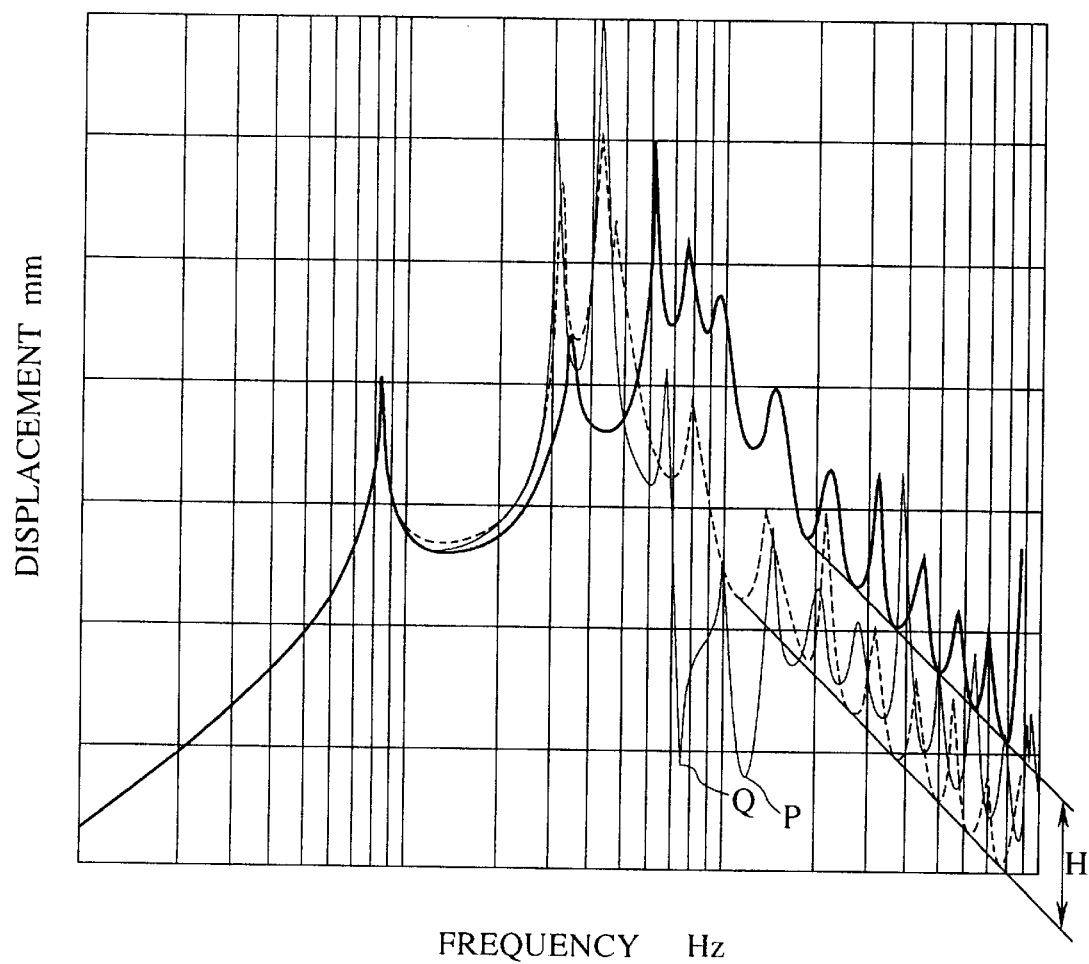
FIG. 11 is a graph showing vibration transmitting characteristics of the panhard rod in comparison with conventional one.

FIG. 11 shows a vibration transmitting characteristics of the panhard rod 25 for comparison with that of the conventional example. Namely, in FIG. 11, a thick continuous line shows the case where masses are not provided, a broken line shows the case where only masses are provided, and a fine line shows the case where masses are so provided that it causes the principal inertia axis to reconcile with the principal elastic axis. Further, an imputed frequency of noise is shown at the horizontal axis and displacement of the collar section is shown at the vertical axis. In this graph, an increase of the displacement means that more vibrations are transmitted, in particular, a position where a peak is raised represents a point where the panhard rod 25 resonates with the noise, and also represents the frequency in which the vibration transmitting characteristics are pronounced.

When the masses are not provided it produces a large displacement so that the vibration transmitting characteristics become most pronounced. When only the masses are provided, it can only improve vibration transmitting characteristics equivalent to H. It can not have a frequency region where the vibration transmitting characteristics are improved substantially. Compared with this, in this embodiment shown by the fine line, the substantially improved frequency region exists as shown with P or Q. Consequently, for example, by causing this frequency region to reconcile with the frequency of diff noise, the frequency transmitting characteristics of the panhard rod 25 with regard to the diff noise are capable of being improved substantially, with the result that the above described effect can be obtained. Moreover, by causing such frequency region to reconcile with the frequency of the another noise, the vibration transmitting characteristics of the panhard rod 25 to the corresponding noise are capable of being improved substantially.

Figure 12:
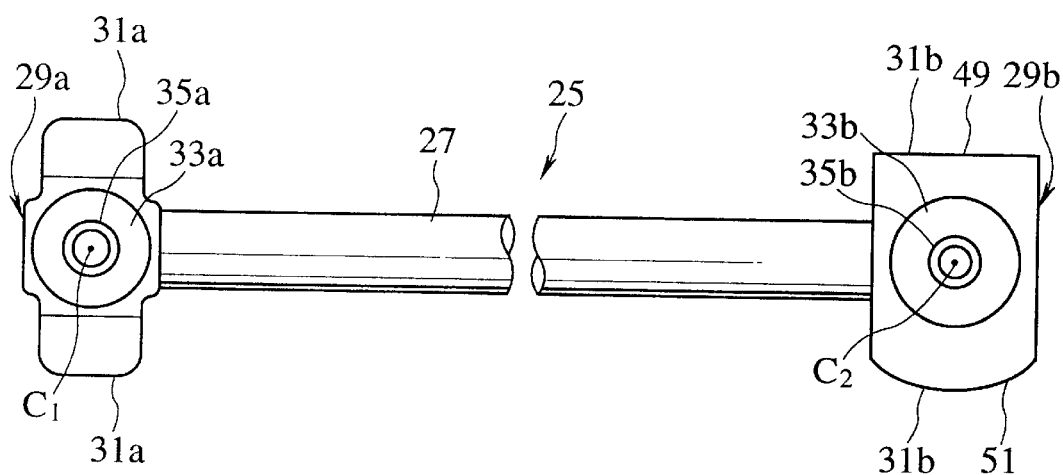
FIG. 12 is a side view showing a panhard rod according to another embodiment of the present invention.

FIG. 12 shows another embodiment of the panhard rod 25 according to the present invention. In thus embodiment, the collar section 29b, and the mass 31b are formed in unsymmetrical shape. Namely, an upper surface 49 of the mass 31b is formed in the shape of flat, and lower surface 51 thereof is formed in the shape of circular-arc. Furthermore, the principal inertia axis and the principal elastic axis are capable of being reconciled by weight establishment thereof due to such unsymmetrical shape, so that operational effects similar to that of the previously described embodiment can be obtained. The collar portion 29a and the mass 31a can also be established with unsymmetrical shape.

Moreover, although each of the masses is so established on both ends of the collar sections 29a and 29b with the principal inertia axis to reconcile with the principal elastic axis, the same operational effects are capable of being obtained by establishing one mass in either end thereof. In the above described embodiment, since there is explained mainly about the diff noise, it causes the vibration in the direction of up and down of the panhard rod 25 to regulate about the bending vibration mode. However, the same effect as that of the up and down bending vibration mode can be obtained by causing the principal inertia axis of the mass reconcile with the principal elastic axis of the bushing about the bending vibration mode looked from the direction along the surface thereof. Namely, by causing the center of gravity of each of the collar section 29a, the mass 31a and the collar section 29b, the mass 31b to reconcile with the three axes for the principal elastic axis of the bushings 33a, 33b, the countermeasure to the multi-direction bending vibration mode is capable of being performed. Furthermore, in the above described embodiment, although the panhard rod is shown as a link, the present invention can be applied to other links.

What is claimed is:

1. A link mechanism comprising:
   a rod section having two ends;
   a receiving side collar portion connected to one of the rod section ends, the receiving side collar portion being adapted to be supported on one body portion through an elastic bushing;
   an exciting side collar portion connected to the other of the rod section ends, the exciting side collar portion being adapted to be supported on another body portion through an elastic bushing; and
   a mass positioned on at least one of the receiving side collar portion and the exciting side collar portion for damping vibration,
   wherein a principal inertia axis of the respective mass is adapted to coincide with a principal elastic axis of the respective bushing to cause at least one node of a bending vibration mode of the rod section to coincide with the principal inertia axis of the mass and the principal elastic axis of the respective bushing.

2. A link mechanism according to claim 1, wherein the mass is symmetrical about the principal inertia axis.

3. A link mechanism according to claim 1, wherein the mass is integral with the collar section.

4. A link mechanism according to claim 1, wherein the one body portion is a body side bracket fixed on an automobile and the another body portion is a case side bracket fixed on an axle case of an automobile.

5. A link mechanism according to claim 1, wherein each of the collar portions has the mass.

* * * * *